US012625325B2

(12) United States Patent
Schlepple et al.

(10) Patent No.: US 12,625,325 B2
(45) Date of Patent: May 12, 2026

(54) OPTICAL SYSTEMS FOR CO-PACKAGED APPLICATIONS

(71) Applicant: Cisco Technology, Inc., San Jose, CA (US)

(72) Inventors: Norbert Schlepple, Macungie, PA (US); Joyce J. M. Peternel, Morgan Hill, CA (US); Bing Shao, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 319 days.

(21) Appl. No.: 18/359,498

(22) Filed: Jul. 26, 2023

(65) Prior Publication Data

US 2025/0035858 A1     Jan. 30, 2025

(51) Int. Cl.
*G02B 6/30* (2006.01)
*G02B 6/38* (2006.01)
*G02B 6/42* (2006.01)
*G02B 6/12* (2006.01)

(52) U.S. Cl.
CPC .............. *G02B 6/30* (2013.01); *G02B 6/381* (2013.01); *G02B 6/4204* (2013.01); *G02B 6/4227* (2013.01); *G02B 6/12* (2013.01); *G02B 6/3838* (2013.01)

(58) Field of Classification Search
None
See application file for complete search history.

(56) References Cited

U.S. PATENT DOCUMENTS 10,345,535 B2     7/2019   Butler et al.
2006/0239605 A1  10/2006  Palen et al.

2011/0194808 A1   8/2011   Kim et al.
2015/0098680 A1   4/2015   Leigh et al.
2017/0192177 A1   7/2017   Nekado et al.
2019/0094460 A1   3/2019   Brusberg et al.
2020/0132953 A1   4/2020   Rosenberg et al.
2020/0219865 A1   7/2020   Nelson et al.
2021/0239912 A1   8/2021   DeMeritt et al.
(Continued)

FOREIGN PATENT DOCUMENTS

JP      H07218772  A     8/1995
WO      2023042471 A1    3/2023

OTHER PUBLICATIONS

Brusberg L., et al., "Pluggable Multimode Edge Connector for Glass-Based Electro-Optical Circuit Boards (EOCB)", Proceedings of Spie, [Proceedings of Spie ISSN 0277-786X vol. 10524], SPIE, US, Add. vol. 10109, Feb. 20, 2017, pp. 101090H-1 to 101090H-7, XP060083303, The Whole Document.
(Continued)

*Primary Examiner* — Jerry Rahll

(74) *Attorney, Agent, or Firm* — Patterson + Sheridan, LLP

(57)     ABSTRACT

An optical system is provided. The optical system includes an optical engine having a photonic integrated circuit (PIC) and an optical lens array, the optical lens array has a lens that is optically aligned with a waveguide in the PIC. The optical system also includes an optical connector optically aligned with the optical lens array to transfer optical signals between the optical connector and the waveguide in the PIC. The optical connector includes a ferrule and an optical fiber mated with the ferrule. The ferrule has a lens aligned with the lens of the optical lens array.

17 Claims, 14 Drawing Sheets

(56)　　　　　　References Cited

U.S. PATENT DOCUMENTS

| | | |
|---|---|---|
| 2022/0029712 A1 | 1/2022 | Marrapode et al. |
| 2022/0373742 A1 | 11/2022 | Kim et al. |
| 2022/0404566 A1 | 12/2022 | Giles et al. |
| 2023/0185035 A1* | 6/2023 | Kim .................... G02B 6/4213 |
| | | 385/14 |

OTHER PUBLICATIONS

European Search Report for European Application No. 24187999.8, dated Dec. 9, 2024, 13 Pages.

* cited by examiner

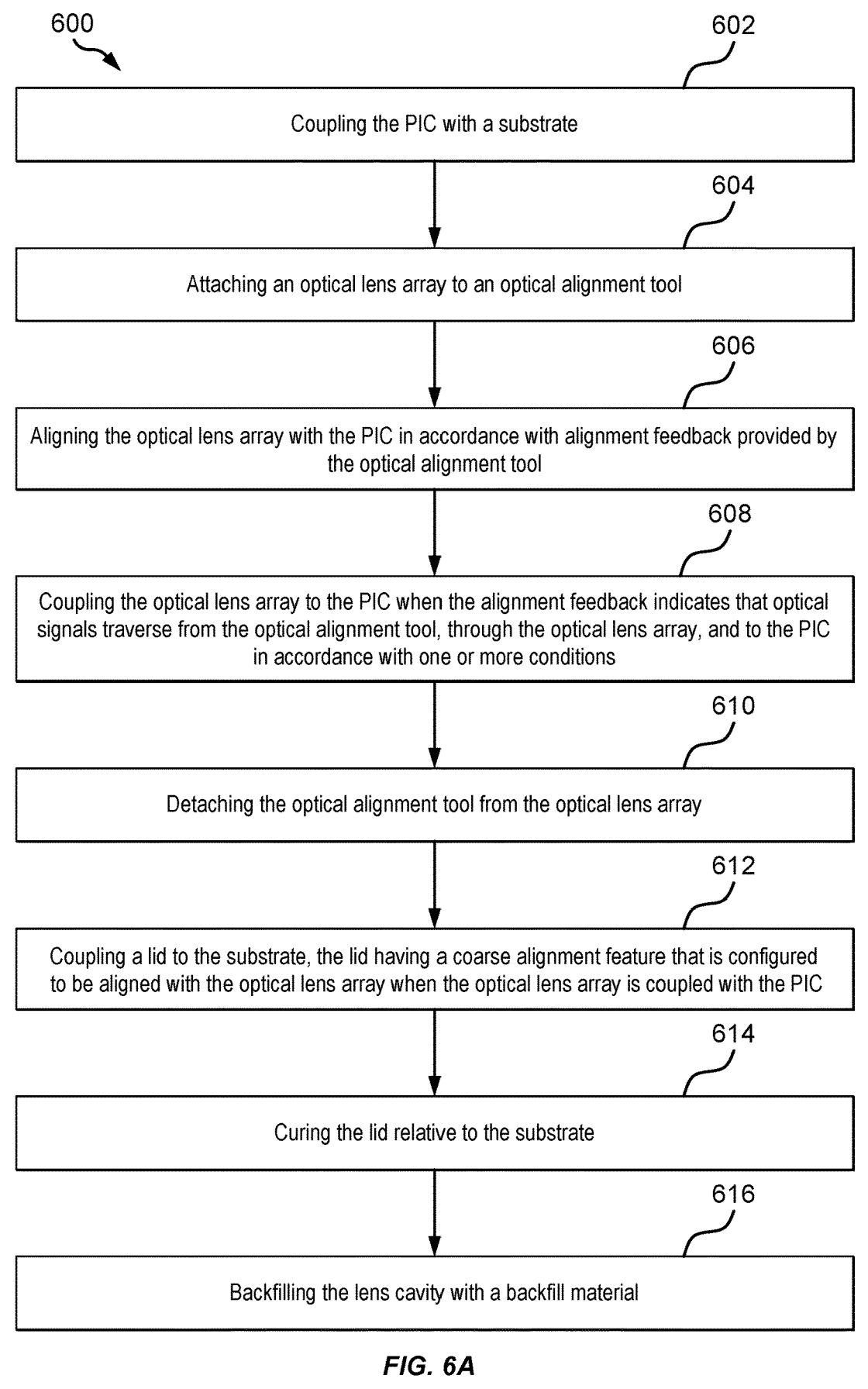

600

602

Coupling the PIC with a substrate

604

Attaching an optical lens array to an optical alignment tool

606

Aligning the optical lens array with the PIC in accordance with alignment feedback provided by the optical alignment tool

608

Coupling the optical lens array to the PIC when the alignment feedback indicates that optical signals traverse from the optical alignment tool, through the optical lens array, and to the PIC in accordance with one or more conditions

610

Detaching the optical alignment tool from the optical lens array

612

Coupling a lid to the substrate, the lid having a coarse alignment feature that is configured to be aligned with the optical lens array when the optical lens array is coupled with the PIC

614

Curing the lid relative to the substrate

616

Backfilling the lens cavity with a backfill material

*FIG. 6A*

OPTICAL SYSTEMS FOR CO-PACKAGED APPLICATIONS

TECHNICAL FIELD

Embodiments presented in this disclosure generally relate to Co-Packaged Optical (CPO) applications, and more specifically, to optical systems for CPO applications.

BACKGROUND

A connectable interface between an optical connector and an optical engine for Co-Packaged Optics (CPO) applications can provide certain processing and application freedom for the optical engine, and in addition, a wide range of optical cables can be used. However, conventional optical connectors for such applications have largely needed to be customized or require brute-force application at the connectable interface to make a connection with an optical engine. Moreover, conventional connectors typically include guide pins for alignment with an optical engine, which can make material selection of components of the optical engine limited. Accordingly, there are certain challenges associated with a connectable interface between an optical connector and an optical engine.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 6A is a flow diagram for a method of assembling an optical engine according to one or more embodiments.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
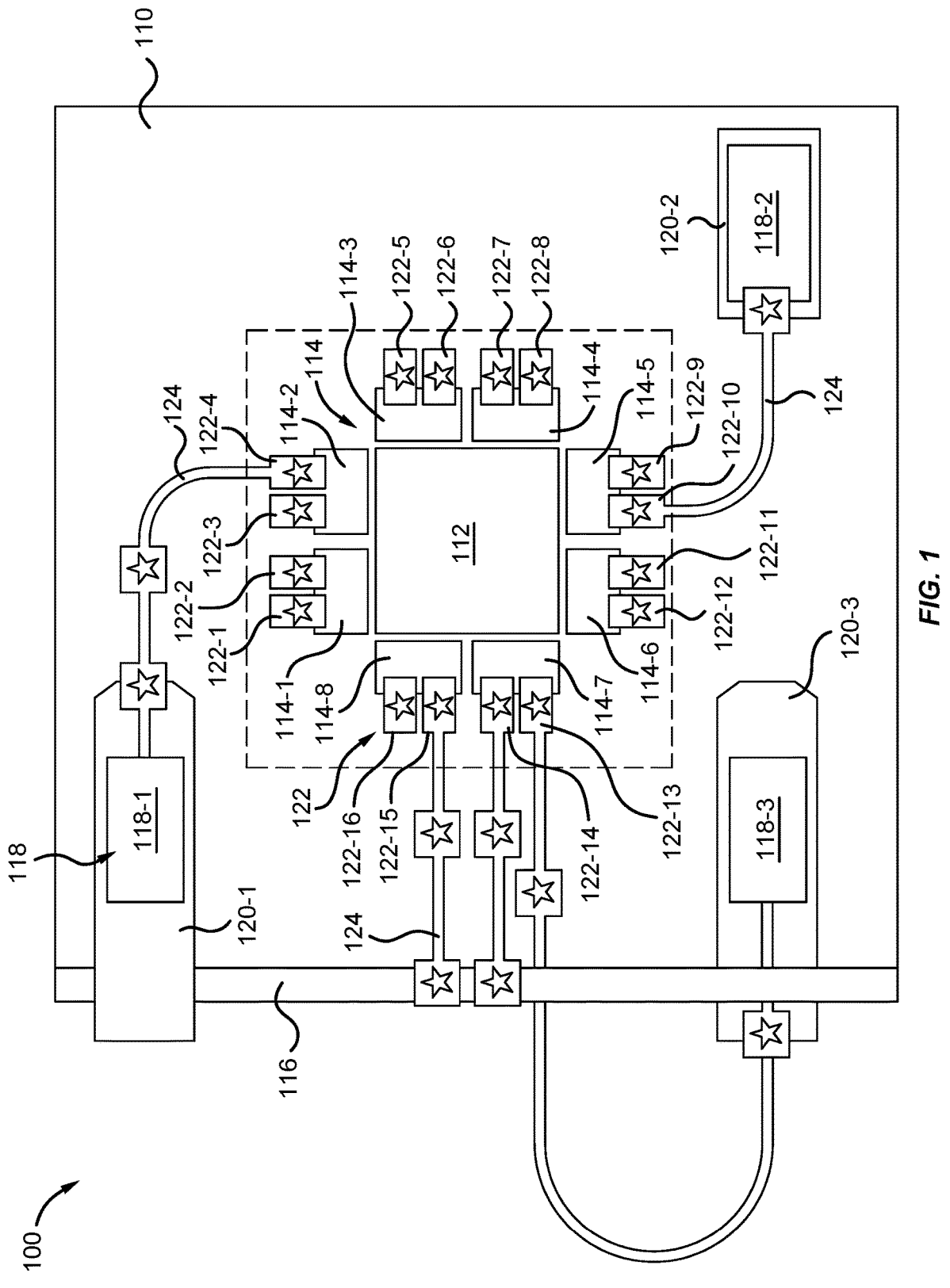
FIG. 1 is a schematic view of an opto-electronic apparatus according to one or more embodiments.

Generally, optical systems for Co-Packaged Optics (CPOs) applications are provided in this disclosure.

One embodiment presented in this disclosure is an optical system. The optical system includes an optical engine having a photonic integrated circuit (PIC) and an optical lens array, the optical lens array has a lens that is optically aligned with a waveguide in the PIC. The optical system also includes an optical connector optically aligned with the optical lens array to transfer optical signals between the optical connector and the waveguide in the PIC. The optical connector includes a ferrule and an optical fiber mated with the ferrule. The ferrule has a lens aligned with the lens of the optical lens array.

One embodiment presented in this disclosure an optical engine. The optical engine includes a lid having a support wall and a lid chamfer. The optical engine also includes a substrate having a substrate chamfer. The lid and the substrate define an interior. The optical engine also includes a photonic integrated circuit (PIC) positioned at least in part within the interior. The optical engine further includes an optical lens array coupled with the PIC and the support wall. The optical lens array has a lens optically aligned with a waveguide of the PIC. The lid chamfer and the substrate chamfer are arranged to guide a ferrule of an optical connector toward the optical lens array and the optical lens array has a chamfer arranged to guide a lens of the ferrule into optical alignment with the lens of the optical lens array.

One embodiment presented in this disclosure is a method of assembling an optical engine. The method includes attaching an optical lens array to an optical alignment tool. The method also includes aligning the optical lens array with a photonic integrated circuit (PIC) in accordance with alignment feedback provided by the optical alignment tool. Further, the method includes coupling the optical lens array to the PIC when the alignment feedback indicates that optical signals traverse from the optical alignment tool, through the optical lens array, and to the PIC in accordance with one or more conditions. The method also includes detaching the optical alignment tool from the optical lens array.

EXAMPLE EMBODIMENTS

Provided herein are various embodiments of optical systems for Co-Packaged Optics (CPO) applications. Such optical systems address one or more of the challenges associated with conventional optical systems for CPO applications. Generally, an optical system of this disclosure can include an optical engine and an optical connector removably coupled thereto. When a connection is made between the optical connector and the optical engine, optical signals can transverse therebetween.

Advantageously, an optical engine and/or an optical connector of the present disclosure can include a number of features that facilitate coupling of the optical connector with the optical engine. In some aspects, the optical engine can include coarse alignment features that help facilitate coarse alignment of an optical connector with the optical engine. In some embodiments, a lid and/or substrate can include such coarse alignment features. The coarse alignment features can include chamfered edges and/or radiused corners that help to guide an optical connector toward an optical lens array of the optical engine.

In other aspects, the optical engine can include fine alignment features that help with fine alignment of an optical connector with the optical engine, or more specifically, with optically aligning one or more lenses of the optical connector with one or more corresponding lenses of the optical lens array of the optical engine. In some embodiments, the optical lens array and/or the optical connector can include such fine alignment features. The fine alignment features can include chamfered edges or drafts that help to guide lenses of the optical connector with lenses of the optical lens array of the optical engine. Beneficially, such fine alignment features can eliminate or otherwise reduce the need for guide pins configured to facilitate optical alignment of lenses or optical elements. Moreover, such fine alignment features can enable the use of glass or similar materials for the lenses of the optical connector and/or the optical lens array of the optical engine. The use of glass or silicon or similar materials can facilitate matching of the Coefficients of Thermal Expansion (CTE) of the optical lens array and a Photonics Integrated Circuit (PIC) of the optical engine. In addition, the use of such materials can facilitate achieving Surface Mount Technology (SMT) reflowability goals.

Further, advantageously, the optical engine can include features that provide mechanical support to an optical lens array coupled with the PIC. Particularly, a lid of the optical engine can include a support wall that is arranged proximate, but spaced from, the optical lens array. A lens cavity is defined between the optical lens array and the support wall of the lid. A backfill material can be backfilled or otherwise disposed within the lens cavity to couple the optical lens array with the support wall. The backfill material can have material properties such that a threshold hardness of the backfill material does not damage the optical lens array, e.g., as a result of thermally-induced stresses due to a mismatch of the CTEs between the optical lens array and surrounding components, but yet rigid enough to provide mechanical support to the optical lens array, e.g., during peak force exposure, namely during optical connector insertion/extraction.

In addition, the optical engine of this disclosure is advantageously arranged to facilitate a more compact optical connector interface, which is especially useful for CPO applications. Such an arrangement can, e.g., replace default fiber pigtail arrangements. Further benefits include the elimination or reduced need for customized optical connectors and/or optical fibers, additional freedom for optical engine placement is provided as the optical engine is independent of fiber handling and fiber length), and less weight and fewer plastic components are needed compared to conventional optical engines for CPO applications. Moreover, the mating force needed to couple and optical connector with such an optical engine can be reduced, e.g., due to conventional optical systems.

Furthermore, the optical lens array can be directly coupled with a PIC, which can beneficially facilitate transfer of optical signals from an optical connector to a waveguide of the PIC. As one example, the optical lens array can be formed of glass and can be attached to an edge of the PIC to transition a collimated beam (e.g., from an Expanded Beam Optics (EBO) optical connector) to a focused beam matched to a Spot-Size Converter (SSC) Mode Field Diameter (MFD). As another example, the optical lens array can be formed of glass and can be attached to a top surface of the PIC to transition a collimated beam (e.g., from an EBO optical connector) to a focused beam matched to SSC MFD. In such examples, a deflecting element (e.g., a Total Internal Reflection (TIR) surface or mirror) and/or additional beam shaping elements (e.g., aspherical surfaces to change beam divergence) can be used to transition optical signals from the optical connector to one or more waveguides of the PIC.

In addition, advantageously, a wide variety of optical connectors, including EBO connectors, can be used with optical engines of this disclosure. For instance, EBO optical connectors can offer "free space coupling" from optical fiber to PIC, resulting in low coupling losses. Moreover, on top of coupling performance, EBO optical connectors offer relatively low mating force and low maintenance (dust). Also, other optical connectors can be used. For instance, a ferrule of a Mechanically Transferrable (MT) optical connector can be coupled with an EBO lens plate to form an MT-EBO optical connector. Such an MT-EBO optical connector can advantageously combine the benefits of MT optical connectors and EBO optical connectors.

In yet further aspects, a method of assembling an optical engine is provided. Such a method advantageously offers a unique technique for assembling an optical engine with alignment features as well as the unique arrangement of the optical lens array relative to the PIC and the lid. A spacer can be used to maintain spacing between the optical lens array and other components during assembly.

Example embodiments of optical systems and methods of assembly therefore, as well as optical connectors and optical engines of such optical systems, that can achieve one or more of the noted benefits and/or advantages are provided below.

FIG. 1 is a schematic view of an opto-electronic apparatus 100 according to one or more embodiments. In FIG. 1, the opto-electronic apparatus 100 is configured as a CPO system. As shown, the opto-electronic apparatus 100 includes, among other components, a substrate 110, an electronic integrated circuit (IC) 112, and one or more optical engines 114-1 through 114-8 (generically or collectively, optical engine(s) 114). The electronic IC 112 is centrally located on the substrate 110 and the optical engines 114 are arranged laterally outward from the electronic IC 112. Other arrangements of the electronic IC 112 and the optical engines 114 are also contemplated. The electronic IC 112 and the optical engines 114 can have any suitable functionality. The electronic IC 112 can be a Network Processor Unit (NPU), for example. The optical engines 114 can be configured for realizing photoelectric signal conversion. A faceplate 116 is coupled with the substrate 110. The faceplate 116 can provide a pluggable interface with the opto-electronic apparatus 100.

In some embodiments, the substrate 110 conductively couples the electronic IC 112 and the optical engines 114. Particularly, the substrate 110 can include one or more layers, such as conductive layer(s), semiconductor layer(s), and/or insulator layer(s). The substrate 110 can further include one or more conductive vias extending between layers, and/or extending to a top surface and/or a bottom surface of the substrate 110. For instance, the substrate 110 can include first conductive connections on a top surface of the substrate 110, second conductive connections on a bottom surface of the substrate 110, and conductive vias connecting the first and second conductive connections. In this way, the electronic IC 112 and the optical engines 114 can be mounted on the top surface and connected through the substrate 110 to a printed circuit board (PCB) or other device connected to the bottom surface.

In addition, the opto-electronic apparatus 100 includes one or more light sources. For the depicted embodiment of FIG. 1, the opto-electronic apparatus 100 includes a plurality of remote light sources (RLS) 118-1, 118-2, 118-3 (generi-cally or collectively, RLS(s) 118). In some embodiments, the RLS 118 can be lasers and can be either single- or multi-wavelength light sources. RLS 118-1, 118-2, 118-3 are disposed within respective light source enclosures 120-1, 120-2, 120-3.

The opto-electronic apparatus 100 further includes one or more optical connectors and one or more optical fibers. For the illustrated embodiment of FIG. 1, the opto-electronic apparatus 100 includes a plurality of optical connectors (generically or collectively, optical connector(s) 122) and a plurality of optical fibers (generically or collectively, optical fiber(s) 124). The optical connectors 122 include a set of optical engine connectors 122-1 through 122-16 each con-figured to optically couple with one of the optical engines 114. The optical connectors 122 also include a set of mid-board optical connectors that optically couple one opti-cal fiber with another, a set of faceplate optical connectors that each offer optical coupling at the faceplate 116, and a set of RLS optical connectors 122-4 each configured to opti-cally couple with one of the RLS 118. The optical fibers 124 (not all of which are labeled in FIG. 1) can carry optical signals, e.g., from one of the RLS 118 to one of the optical connectors 122, which can in turn direct the optical signals to a Photonics Integrated Circuit (PIC) of one of the optical engines 114. Example embodiments detailing inventive aspects relating to the coupling interface between an optical connector and an optical engine are provided below.

Figure 2A:
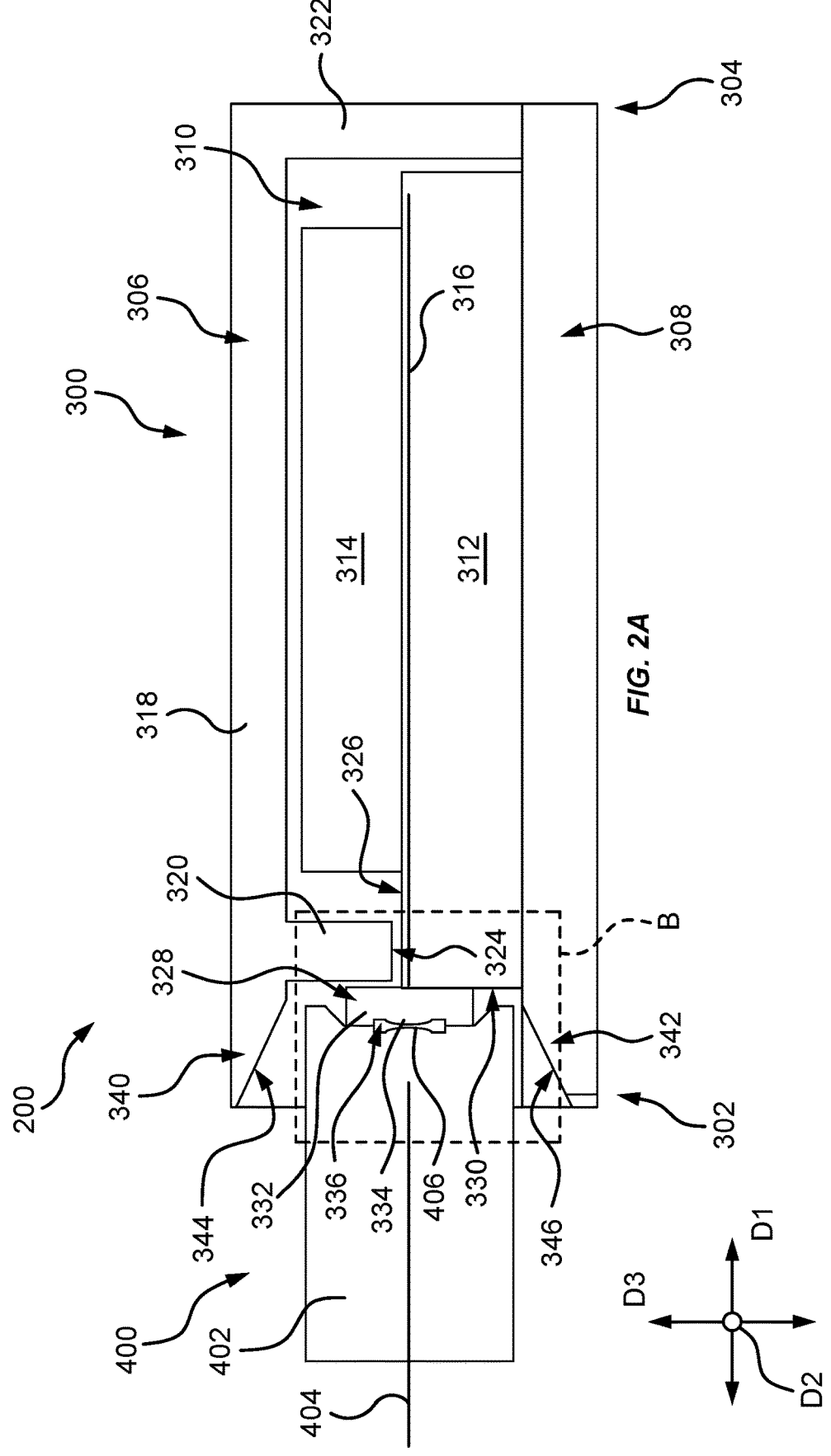
FIG. 2A is a schematic cross-sectional view of an optical system according to one or more embodiments.

FIG. 2A is a schematic cross-sectional view of an optical system 200 according to one or more embodiments. The optical system 200 can be incorporated into an opto-elec-tronic apparatus, such as the opto-electronic apparatus 100 of FIG. 1. As depicted in FIG. 2A, the optical system 200 includes an optical engine 300 and an optical connector 400. The optical connector 400 can be coupled with the optical engine 300, e.g., as shown in FIG. 2A, or as desired, the optical connector 400 can be removed or disconnected from the optical engine 300. In this regard, the optical connector 400 can be considered to be removably coupled with the optical engine 300. For reference, a first direction D1, a second direction D2 (extending into and out of the page in FIG. 2A), and a third direction D3 are defined. The first, second, and third directions D1, D2, D3 are mutually perpendicular and form an orthogonal direction system. In some embodiments, the third direction D3 can be a vertical direction.

As depicted in FIG. 2A, the optical engine 300 extends between a first end 302, or an interface end, and a second end 304, e.g., along the first direction D1. The optical engine 300 has a lid 306 and a substrate 308 that collectively define an interior 310. The lid 306 can be coupled with the substrate

308, e.g., at the second end 304. The substrate 308 can be formed of an organic or ceramic material, for example. Various components can be contained within the interior 310, such as a photonic integrated circuit (PIC), or PIC 312, and an electronic integrated circuit (EIC), or EIC 314. Both the PIC 312 and the EIC 314 are positioned or extend, at least in part, within the interior 310. The PIC 312 can include a waveguide 316.

The lid 306 has a body formed of a plurality of walls, including a top wall 318, a support wall 320, and a rear wall 322 that collectively define the top and rear portions of the interior 310. The lid 306 can also include sidewalls to fully enclose the interior 310. The support wall 320 is spaced from the rear wall 322, e.g., along the first direction D1, and extends from the top wall 318. Specifically, in the depicted embodiment of FIG. 2A, the support wall 320 extends from the top wall 318 downward along the third direction D3. A span of the support wall 320 extends along the third direc-tion D3 less than half but greater than one-quarter a span of the rear wall 322. Moreover, as illustrated in FIG. 2A, a bottom end 324 of the support wall 320 is spaced from a top surface 326 of the PIC 312, e.g., along the third direction D3.

The optical engine 300 also includes an optical lens array 328 optically aligned with the waveguide 316 in the PIC 312. For the depicted embodiment of FIG. 2A, the optical lens array 328 is directly coupled with the PIC 312. More specifically, the optical lens array 328 is coupled with a side wall or side edge 330 of the PIC 312. A portion of the optical lens array 328 (e.g., a bottom portion thereof) is coupled with the PIC 312 while at least a portion of the optical lens array 328 extends above the PIC 312, e.g., along the third direction D3. The portion of the optical lens array 328 that extends above the PIC 312 overlaps with the support wall 320 of the lid 306, e.g., along the third direction D3, and is spaced from the support wall 320, e.g., along the first direction D1. The optical lens array 328 can be formed of a glass and/or silicon material, for example. Such materials for the optical lens array 328 can facilitate matching of the Coefficients of Thermal Expansion (CTEs) between the optical lens array 328 and the PIC 312.

The optical lens array 328 includes a body 332 and at least one lens, represented by lens 334 (e.g., a first lens). The optical lens array 328 can include a plurality of lenses, e.g., as shown in FIGS. 3A, 3B, 3C. The lens 334 extends from the body 332. The body 332 defines an optical lens array cutout 336 so that an apex of the lens 334 is recessed relative to a leading edge 338 (FIG. 2B) of the optical lens array 328, e.g., as shown in FIG. 2A. The lens 334 extends from the body 332 and is disposed within the optical lens array cutout 336.

Figures 5A, 5B:
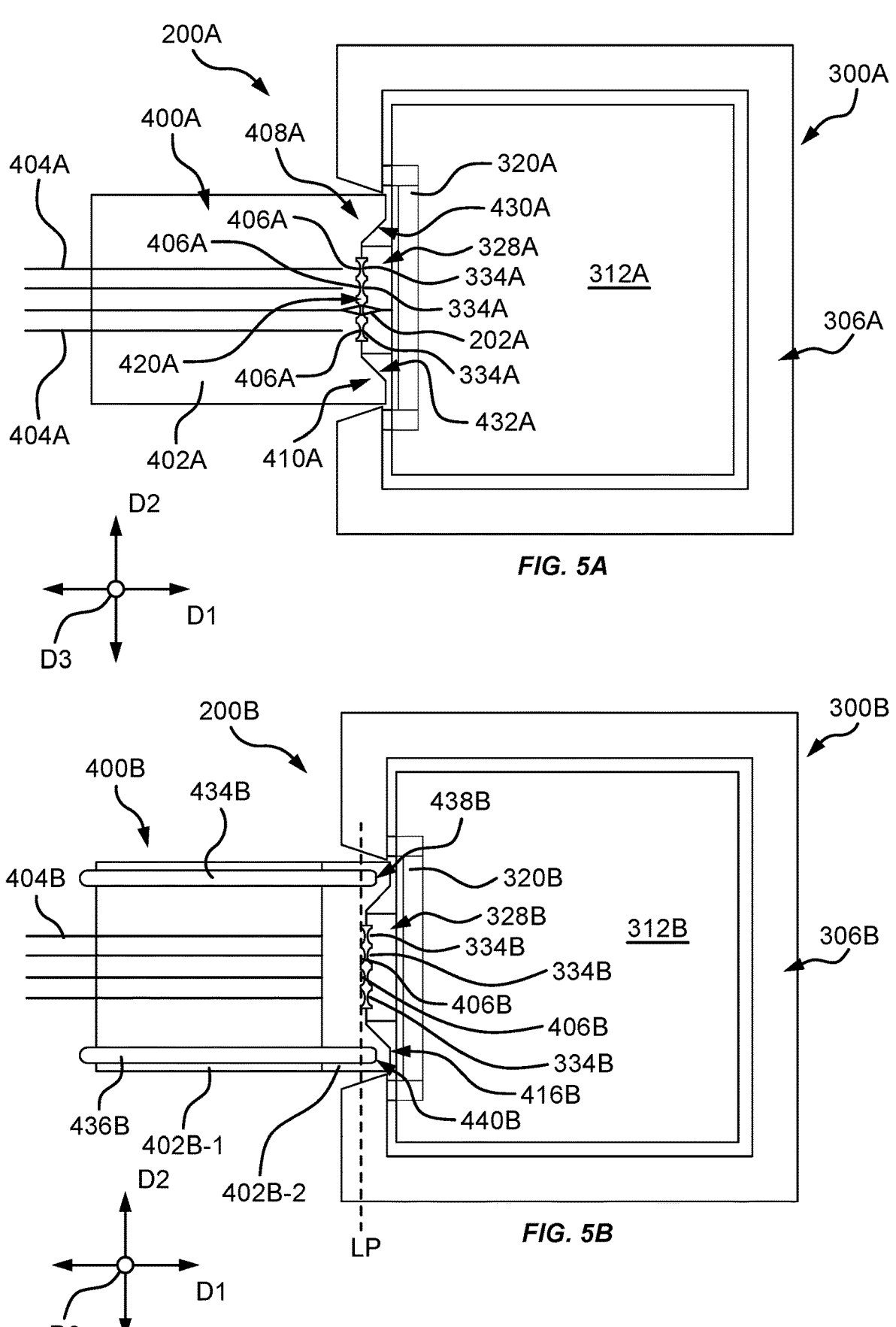
FIG. 5A is a schematic top view of an optical system having an EBO optical connector coupled with an optical engine.
FIG. 5B is a schematic top view of an optical system having an MT-EBO optical connector coupled with an optical engine.

As further depicted in FIG. 2A, the optical connector 400 is optically aligned with the optical lens array 328 to transfer optical signals between the optical connector 400 and the waveguide 316 in the PIC 312. The optical connector 400 includes a ferrule 402 and an optical fiber 404 mated with the ferrule 402. The ferrule 402 has a lens 406 (e.g., a second lens) that can be aligned with the lens 334 of the optical lens array 328 when the optical connector 400 is coupled with the optical engine 300, e.g., as shown in FIG. 2A. In some embodiments, the lens 406 can be one of a plurality of lenses of the ferrule 402, e.g., as shown in FIGS. 5A, 5B. In such embodiments, the lenses 406 of the ferrule 402 can align with respective ones of the plurality of lenses 334 of the optical lens array 328.

The optical engine 300 and the optical connector 400 of the optical system 200 can both have alignment features that facilitate mechanical and optical coupling of the optical connector 400 with the optical engine 300. In some embodiments, for instance, the optical engine 300 can include one or more coarse alignment features that facilitate coarse alignment of the optical connector 400 with the optical engine 300. In some embodiments, in addition or alternatively to the coarse alignment features, the optical connector 400, the optical engine 300, or both, can include one or more fine alignment features that facilitate fine alignment of the optical connector 400 with the optical engine 300. Specifically, in some embodiments, the ferrule 402 of the optical connector 400, the optical lens array 328 of the optical engine 300, or both, can include fine alignment features that facilitate optical alignment of the lens 406 of the ferrule 402 relative to the lens 334 of the optical lens array 328.

With respect to coarse alignment features defined by the optical engine 300, the lid 306, the substrate 308, or both can each include coarse alignment features that facilitate coarse alignment of the optical connector 400 with the optical engine 300, e.g., during the connection or coupling process. For the depicted embodiment of FIG. 2A, for example, the lid 306 includes a coarse alignment feature 340 and the substrate 308 includes a coarse alignment feature 342. Specifically, at the interface or first end 302 of the optical engine 300, the top wall 318 of the lid 306 defines a lid chamfer 344 and the substrate 308 can define a substrate chamfer 346. In this regard, the optical engine 300 has opposing top and bottom coarse alignment features that can guide the optical connector 400 into the optical engine 300 during a connection or coupling process. Such coarse alignment can facilitate positioning of the ferrule 402 into position with respect to the optical lens array 328 so that optical alignment between them can be achieved. In some embodiments, the lid and substrate chamfers 344, 346 can extend the full length of the lid 306 and substrate 308 along the second direction D2, respectively. In other embodiments, the lid and substrate chamfers 344, 346 can extend only a portion of the length of the lid 306 and substrate 308 along the second direction D2, respectively, e.g., as shown in FIG. 3C.

In some further embodiments, in addition or alternatively to the lid chamfer 344, the lid 306 can include first and second sidewall chamfers 345, 347 (FIG. 3B). The substrate 308 can include a first radiused corner 349 (FIG. 3C) and a second radiused corner 351 (FIG. 3C) positioned on opposing ends of the substrate chamfer 346, e.g., as shown in FIG. 3C. The first and second radiused corners 349, 351 transition the substrate chamfer 346 to a top surface of the substrate 308. The lid chamfer 344, the first and second sidewall chamfers 345, 347, the substrate chamfer 346, and the first and second radiused corners 349, 351 can collectively define a perimeter guiding edge 353 along a perimeter of an access opening 355 to the optical lens array 328, e.g., as shown in FIG. 3C. The access opening 355 is collectively defined by the lid 306 and the substrate 308. Such an embodiment can facilitate coarse alignment both vertically and horizontally, which may advantageously aid optical alignment of the lens 406 of the ferrule 402 with the lens 334 of the optical lens array 328.

With respect to fine alignment features defined by the optical connector 400, the optical engine 300, or both, various embodiments are provided below.

Figure 2B:
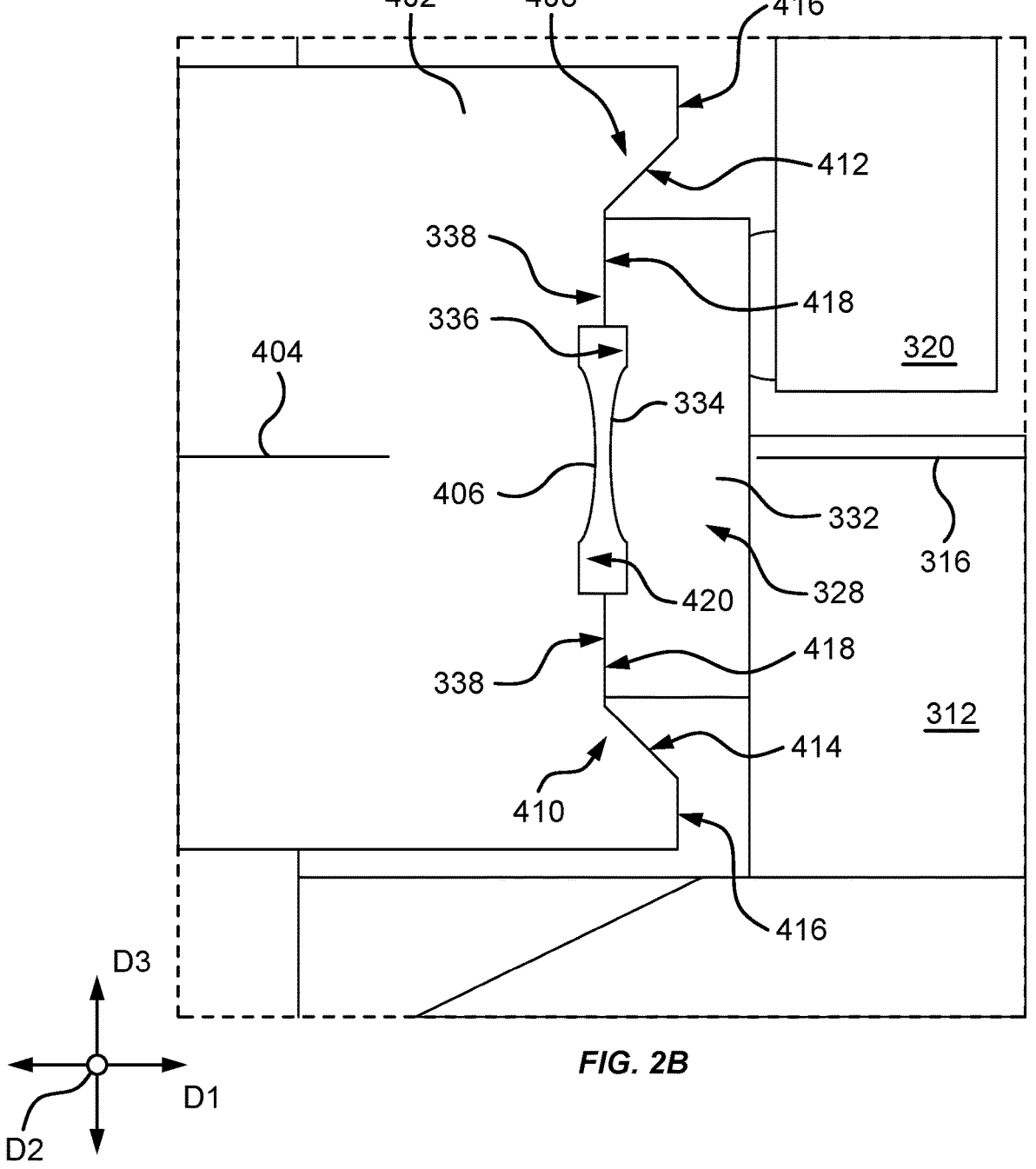
FIG. 2B is a close-up, cross-sectional view of a portion of the optical system of FIG. 2A, taken from Section B in FIG. 2A.
Figure 3A:
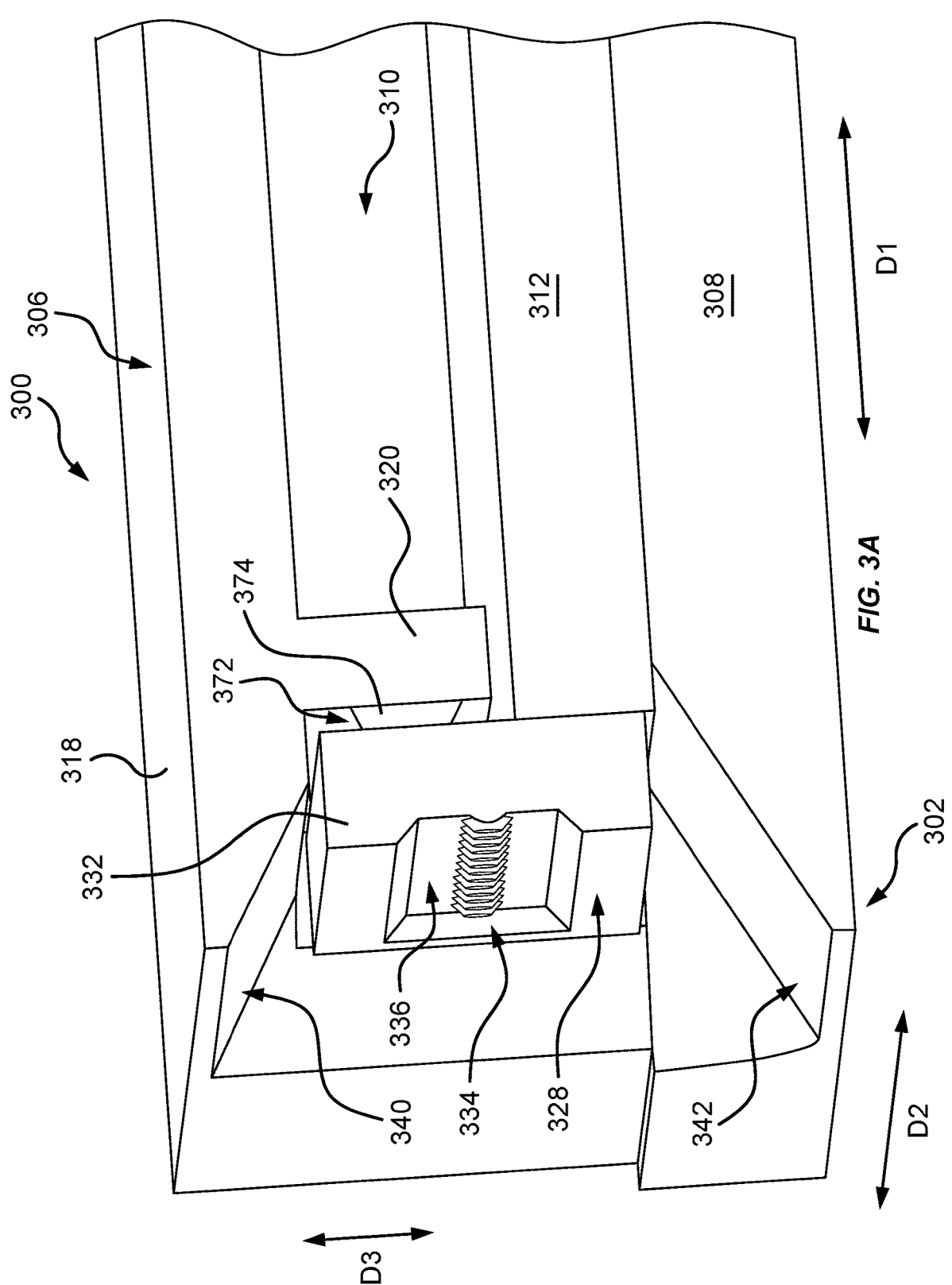
FIG. 3A is a cross-sectional view of a portion of the optical engine of FIG. 2A.
Figures 3B, 3C:
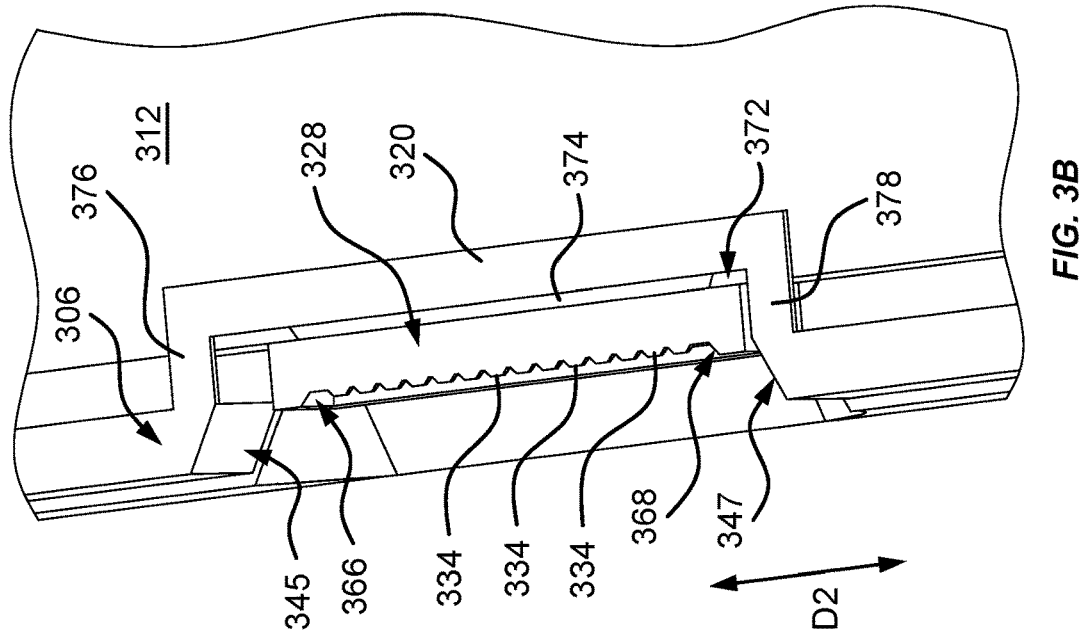
FIG. 3B is a top-looking-down cross-sectional view of a portion of the optical engine of FIG. 2A.
FIG. 3C is a perspective view of a portion of the optical engine of FIG. 2A, with an optical lens array thereof shown transparent for illustrative purposes

FIG. 2B is a close-up, cross-sectional view of a portion of the optical system 200 of FIG. 2A, taken from Section B in FIG. 2A. For the depicted embodiment of FIG. 2B, the ferrule 402 of the optical connector 400 includes fine alignment features 408, 410, including a first chamfer 412 and a second chamfer 414 spaced from the first chamfer 412, e.g., along the third direction D3. The lens 406 is positioned between the first chamfer 412 and the second chamfer 414, e.g., along the third direction D3. The first chamfer 412 transitions a lead edge 416 of the ferrule 402 to a recessed edge 418, e.g., at a top portion of the ferrule 402, and the second chamfer 414 transitions the lead edge 416 of the ferrule 402 to the recessed edge 418, e.g., at a bottom portion of the ferrule 402. The recessed edge 418 defines a ferrule cutout 420 in which the lens 406 of the ferrule 402 is disposed. An apex of the lens 406 can be recessed with respect to the recessed edge 418 so as to protect the lens 406 of the ferrule 402 during a connection or coupling process of the optical connector 400 with the optical engine 300. During a connection or coupling process, the first and second chamfers 412, 414 can facilitate fine alignment of the lens 406 of the ferrule 402 with the lens 334 of the optical lens array 328, or particularly in this example embodiment, so that the recessed edge 418 of the ferrule 402 is guided into position to mate or interface with the leading edge 418 of the optical lens array 328 so as to optically align the lens 406 with the lens 334.

Figure 2C:
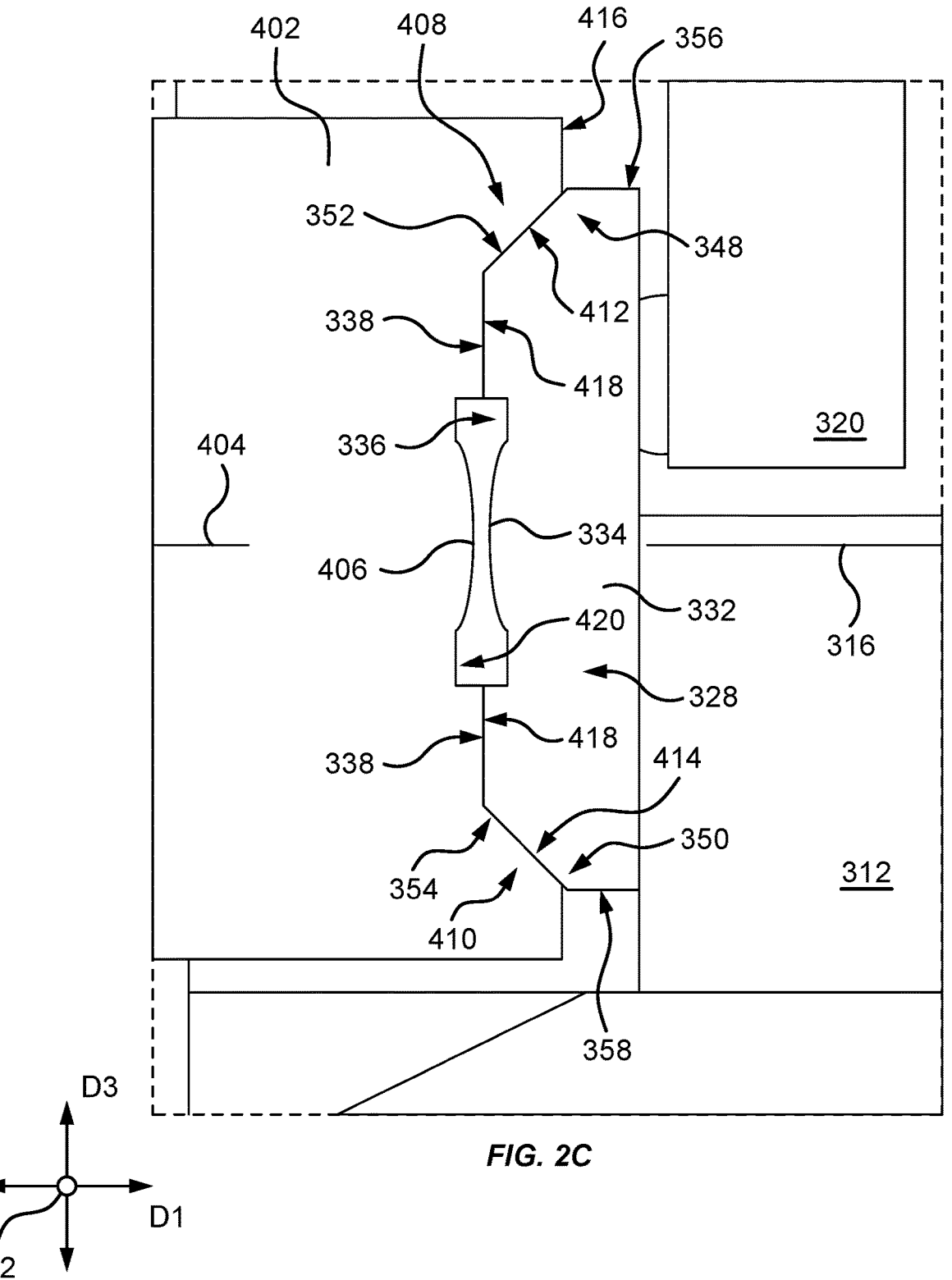
FIG. 2C is a close-up, cross-sectional view of another embodiment of an optical connector and an optical engine that can be incorporated into the optical system of FIG. 2A.

FIG. 2C is a close-up, cross-sectional view of another embodiment of the optical connector 400 and the optical engine 300 that can be incorporated into the optical system 200 of FIG. 2A. As shown in FIG. 2C, the ferrule 402 of the optical connector 400 and the optical lens array 328 of the optical engine 300 can both include fine alignment features. The ferrule 402 includes the fine alignment features 408, 410 as in the embodiment of FIG. 2B. Accordingly, the ferrule 402 includes the first chamfer 412 and the second chamfer 414.

The optical lens array 328 can also include fine alignment features 348, 350. Particularly, the optical lens array 328 includes a first chamfer 352 and a second chamfer 354 spaced from the first chamfer 352, e.g., along the third direction D3. The lens 334 are positioned between the first chamfer 352 and the second chamfer 354, e.g., along the third direction D3. The first chamfer 352 transitions a top side edge 356 of the optical lens array 328 to the leading edge 338 of the optical lens array 328, e.g., at a top portion of the optical lens array 328. The second chamfer 354 transitions a bottom side edge 358 of the optical lens array 328 to the leading edge 338 of the optical lens array 328, e.g., at a bottom portion of the optical lens array 328. The leading edge 338 defines the optical lens array cutout 336 in which the lens 334 of the optical lens array 328 are disposed. An apex of the lens 334 can be recessed with respect to the leading edge 338 so as to protect the lens 334 during a connection or coupling process.

During a connection or coupling process, the first and second chamfers 412, 414 of the ferrule 402 and the first and second chamfers 352, 354 of the optical lens array 328 can facilitate fine alignment of the lens 406 of the ferrule 402 with the lens 334 of the optical lens array 328, or particularly in this example embodiment, so that the complementarily-shaped first and second chamfers 412, 414 of the ferrule 402 and first and second chamfers 352, 354 of the optical lens array 328 interface in mating engagement and so that the lead edge 418 of the ferrule 402 is guided into position to mate or interface with the leading edge 338 of the optical lens array 328 so as to optically align the lens 406 with the lens 334. The complementary chamfers of the ferrule 402 and the optical lens array 328 can be particularly advantageous in guiding the ferrule 402 and lens 406 thereof into position with respect to the lens 334 of the optical lens array 328. In this regard, optical alignment of the lens 406 of the ferrule 402 with the lens 334 of the optical lens array 328 can be facilitated.

Figure 2D:
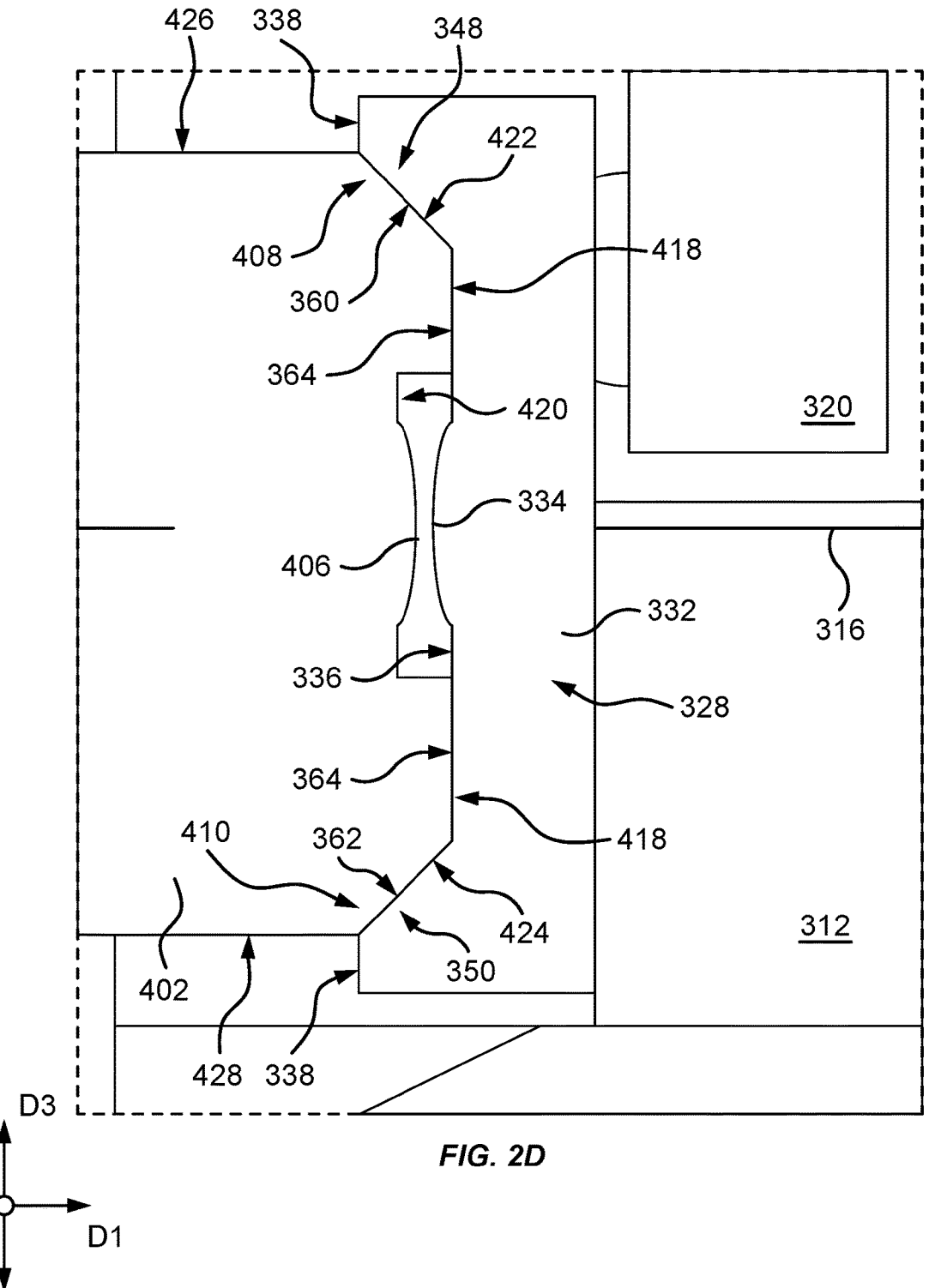
FIG. 2D is a close-up, cross-sectional view of yet another embodiment of an optical connector and an optical engine that can be incorporated into the optical system of FIG. 2A.

FIG. 2D is a close-up, cross-sectional view of yet another embodiment of the optical connector 400 and the optical engine 300 that can be incorporated into the optical system 200 of FIG. 2A. As shown in FIG. 2D, like the embodiment of FIG. 2C, the ferrule 402 of the optical connector 400 and the optical lens array 328 of the optical engine 300 can both include fine alignment features.

The ferrule 402 includes the fine alignment features 408, 410. Specifically, the ferrule 402 can include a first chamfer 422 and a second chamfer 424 spaced from the first chamfer 422, e.g., along the third direction D3. The lens 406 is positioned between the first chamfer 422 and the second chamfer 424, e.g., along the third direction D3. The first chamfer 422 transitions a top side edge 426 of the ferrule 402 to the lead edge 418 of the ferrule 402, e.g., at a top portion of the ferrule 402, and the second chamfer 424 transitions a bottom side edge 428 of the ferrule 402 to the lead edge 418, e.g., at a bottom portion of the ferrule 402. In this example embodiment, the lead edge 418 defines the ferrule cutout 420 in which the lens 406 is disposed. An apex of the lens 406 can be recessed with respect to the lead edge 418 so as to protect the lens 406 of the ferrule 402 during a connection or coupling process.

The optical lens array 328 can also include fine alignment features 348, 350. Specifically, the optical lens array 328 includes a first chamfer 360 and a second chamfer 362 spaced from the first chamfer 360, e.g., along the third direction D3. The lens 334 are positioned between the first chamfer 360 and the second chamfer 362, e.g., along the third direction D3. The first chamfer 360 transitions the leading edge 338 of the optical lens array 328 to a recessed edge 364 of the optical lens array 328, e.g., at a top portion of the optical lens array 328, and the second chamfer 362 transitions the leading edge 338 of the optical lens array 328 to the recessed edge 364, e.g., at a bottom portion of the optical lens array 328. In this example embodiment, the lead edge 338 defines the optical lens array cutout 336 in which the lens 334 of the optical lens array 328 are disposed. Apexes of the lens 334 can be recessed with respect to the leading edge 338 so as to protect the lens 334 of the optical lens array 328 during a connection or coupling process.

During a connection or coupling process, the first and second chamfers 422, 424 of the ferrule 402 and the first and second chamfers 360, 362 of the optical lens array 328 can facilitate fine alignment of the lens 406 of the ferrule 402 with the lens 334 of the optical lens array 328, or particularly in this example embodiment, so that the complementarily-shaped first and second chamfers 422, 424 of the ferrule 402 and first and second chamfers 360, 362 of the optical lens array 328 interface in mating engagement and so that the lead edge 418 of the ferrule 402 is guided into position to mate or interface with the recessed edge 364 of the optical lens array 328 so as to optically align the lens 406 with the lens 334. The complementary chamfers of the ferrule 402 and the optical lens array 328 can be particularly advantageous in guiding the ferrule 402 and lens 406 thereof into position with respect to the lens 334 of the optical lens array 328. In this regard, optical alignment of the lens 406 of the ferrule 402 with the lens 334 of the optical lens array 328 can be facilitated.

In some further embodiments, in addition or alternatively to the first and second chamfers 360, 362, the optical lens array 328 can include a first sidewall chamfer 366 (FIG. 3B) and a second sidewall chamfer 368 (FIG. 3B). When used in combination with the first and second chamfers 360, 362, the first sidewall chamfer 366, the second sidewall chamfer 368, the first chamfer 360, and the second chamfer 362 can collectively define a chamfered edge along a perimeter of the optical lens array cutout 336, or rather, a chamfered perimeter 370 defining the optical lens array cutout 336, e.g., as shown in FIG. 3C. Such an embodiment can facilitate fine alignment both vertically and horizontally, which may advantageously aid optical alignment of the lens 406 of the ferrule 402 with the lens 334 of the optical lens array 328.

In accordance with further inventive aspects of this disclosure, an optical engine can include features that provide mechanical support for an optical lens array thereof. Specifically, in some embodiments, an optical engine can be arranged such that a lid of the optical engine has a structure that provides mechanical support for an optical lens array thereof.

With reference now to FIGS. 3A, 3B, 3C, FIG. 3A is a cross-sectional view of a portion of the optical engine 300, FIG. 3B is a top-looking-down cross-sectional view of a portion of the optical engine 300, and FIG. 3C is a perspective view of a portion of the optical engine 300, with the optical lens array 328 shown transparent for illustrative purposes. As noted above, the lid 306 can include the support wall 320, which extends downward from the top wall 318, e.g., along the third direction D3. First and second lens sidewalls 376, 378 can connect the support wall 320 to the body of the lid 306 at the interface or first end 302 of the optical engine 300.

The support wall 320 is arranged relative to the optical lens array 328 so that the optical lens array 328 and the support wall 320 collectively define a lens cavity 372 therebetween. A backfill material 374 can be disposed within the lens cavity 372. Particularly, in some embodiments, after the optical lens array 328 and the lid 306 are assembled, the lens cavity 372 can be backfilled with the backfill material 374. The backfill material 374 can be an adhesive material that can be used to couple a top portion of the optical lens array 328 with the support wall 320. In some embodiments, the backfill material 374 can be arranged in a contiguous block of material. In other embodiments, the backfill material 374 can be arranged in at least two blocks of material (that are distinct and separate from one another).

In some example embodiments, the backfill material 374 can have properties such that a threshold hardness of the mechanical epoxy does not damage the optical lens array 328, e.g., as a result of thermally-induced stresses due to a mismatch of the Coefficients of Thermal Expansion (CTEs) between the optical lens array 328 and surrounding components, but yet rigid enough to provide mechanical support to the optical lens array 328, especially during peak force exposure, namely during optical connector insertion/extraction, or coupling/decoupling. Stated another way, the backfill material can provide flexibility in allowing the optical lens array 328 and/or components coupled thereto to thermally expand or contract due to their mismatched CTEs yet can provide rigidity to the optical lens array 328 to react or withstand forces placed thereon when an optical connector is inserted or extracted from the optical engine 300.

In accordance with additional inventive aspects of this disclosure, an optical engine can include features that provide advantageous optical coupling implementations between an optical connector and a waveguide of a PIC. In some example embodiments, for example, an optical engine and an optical connector of an optical system can be arranged to enable an edge coupling implementation between the optical connector and the optical engine. In yet other embodiments, an optical engine and an optical connector of an optical system can be arranged to enable a surface coupling implementation between the optical connector and the optical engine. Example embodiments of each implementation are provided below.

Figure 4A:
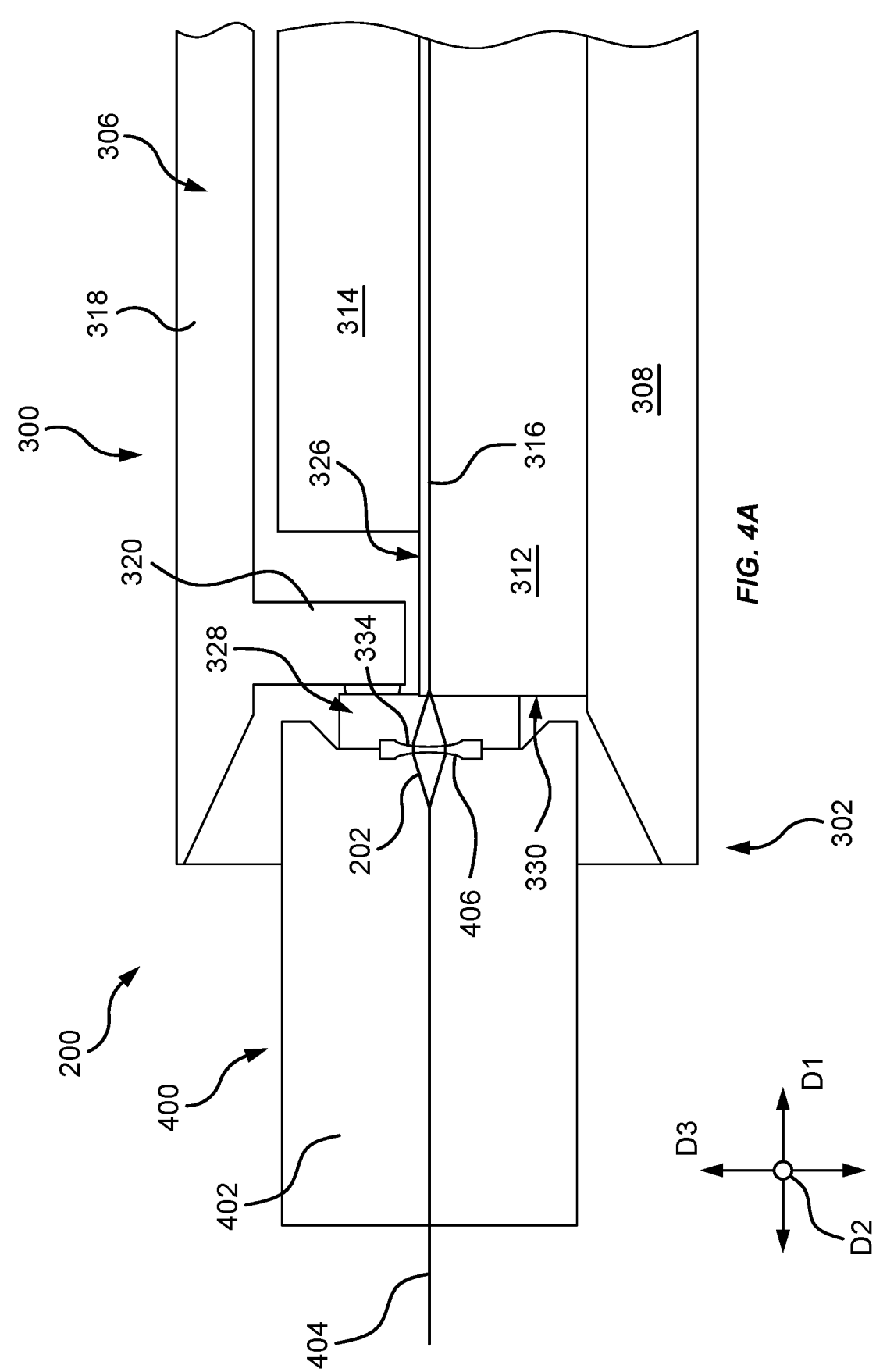
FIG. 4A is a schematic cross-sectional view of a portion of the optical system of FIG. 2A according to one or more embodiments

FIG. 4A is a schematic cross-sectional view of a portion of the optical system 200 according to one or more embodiments. Particularly, FIG. 4A depicts an edge coupling implementation between the optical connector 400 and the optical engine 300. As depicted, the optical lens array 328 is coupled with the PIC 312 so that an optical signal 202, when propagated, traverses from the optical fiber 404 to an edge of the PIC 312, or more specifically, the side edge 330 of the PIC 312. In this regard, the optical lens array 328 is coupled with the PIC 312 so that the optical signal 202 traverses from the optical fiber 404 to the side edge 330 of the PIC 312 along a same optical axis, e.g., an optical axis that extends along the first direction D1.

Figure 4B:
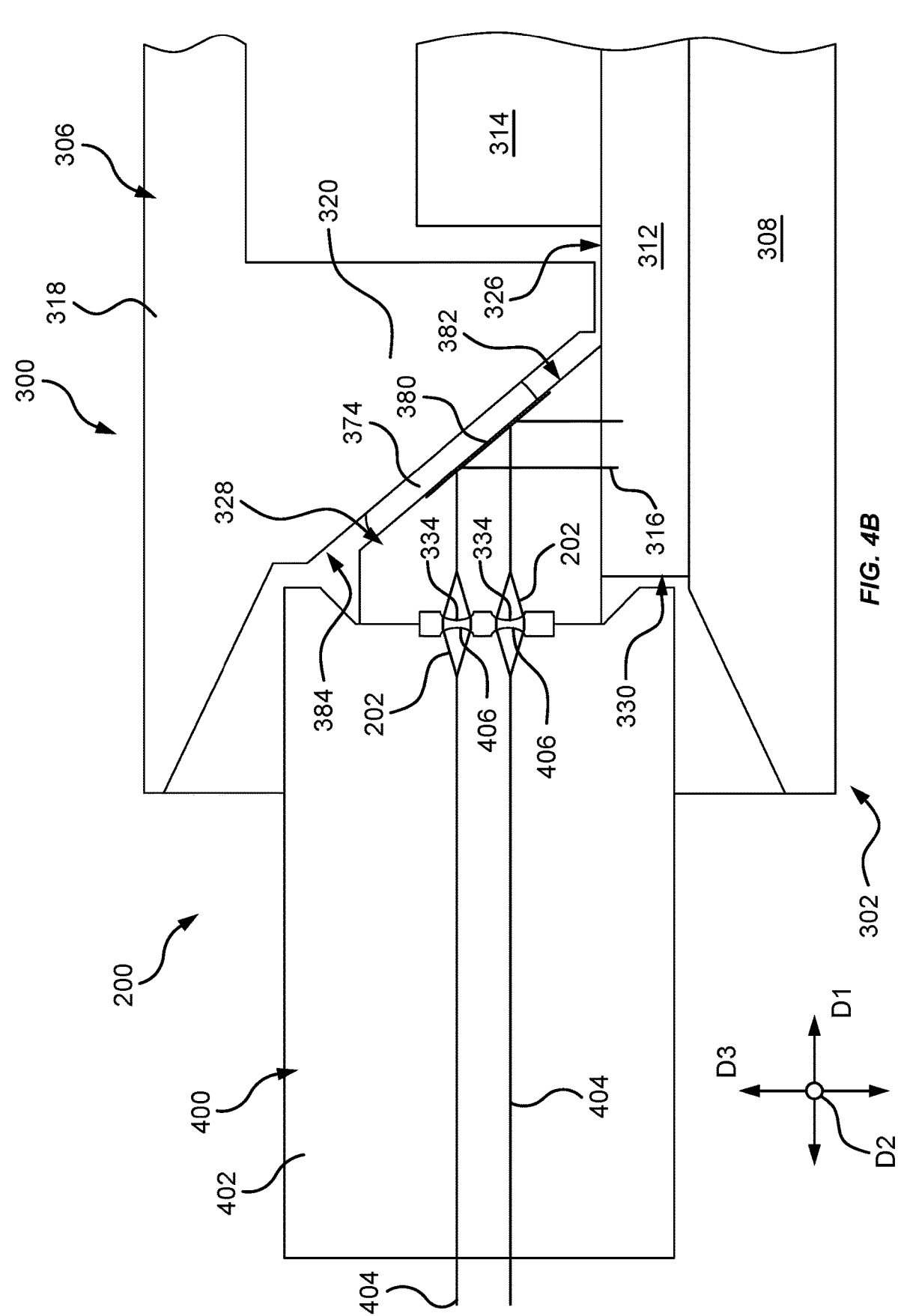
FIG. 4B is a schematic cross-sectional view of a portion of an alternative configuration of the optical system of FIG. 2A according to one or more embodiments

FIG. 4B is a schematic cross-sectional view of a portion of an alternative configuration of the optical system 200 according to one or more embodiments. In FIG. 4B, a surface coupling implementation between the optical connector 400 and the optical engine 300 is provided. As illustrated, the optical lens array 328 is coupled with the PIC 312 so that the optical signal 202 (multiple of which are shown in FIG. 4B), when propagated, traverses from the optical fiber 404 to the top surface 326 of the PIC 312. In this way, the optical lens array 328 is coupled with the PIC 312 so that the optical signal 202, when propagated, traverses from the optical fiber 404 to the top surface 326 of the PIC 312 along at least two different optical axes, e.g., initially along an optical axis extending parallel to the first direction D1 and then an optical axis extending parallel to the third direction D3. Accordingly, the two different optical axes can include a first optical axis and a second optical axis, and the first and second optical axes can be offset ninety degrees (90°) from one another.

For the depicted embodiment of FIG. 4B, the optical lens array 328 includes a deflection mirror 380. The deflection mirror 380 can be integrated into the body of the optical lens array 328 or connected to an outer surface thereof. The deflection mirror 380 is configured to redirect the optical signals 202 from their respective optical fibers 404 to the top surface 326 of the PIC 312, or stated differently, from their respective first optical axes to their respective second optical axes, e.g., as shown in FIG. 4B. The deflection mirror 380 can be angled with respect to the third direction D3, e.g., in a range of between forty and fifty degrees (40°-50°) from the third direction D3, including the endpoints.

Moreover, as shown in FIG. 4B, the optical lens array 328 includes an angled surface 382 that is shaped complementary to an angled surface 384 of the support wall 320. The backfill material 374 is positioned therebetween and likewise has an angled orientation as viewed along the second direction D2. The angled surface 384 of the support wall 320 advantageously ensures that the angled surface 382 of the optical lens array 328 is mechanically supported for the surface coupling implementation. The angled surfaces 382, 384 can be angled with respect to the third direction D3, e.g., in a range of between forty and fifty degrees (40°-50°) from the third direction D3, including the endpoints.

Figure 4C:
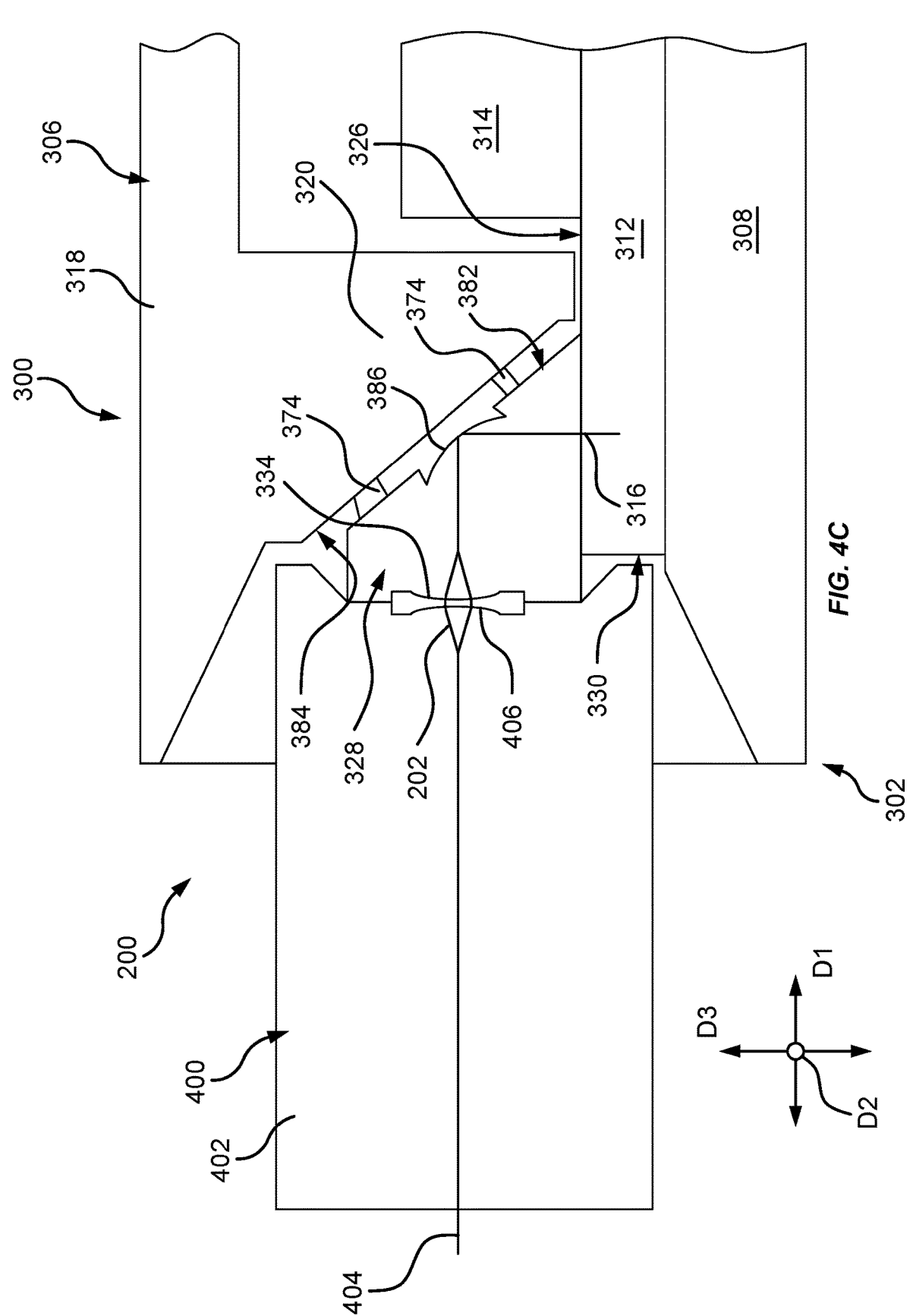
FIG. 4C is a schematic cross-sectional view of a portion of yet another alternative configuration of the optical system of FIG. 2A according to one or more embodiments.

FIG. 4C is a schematic cross-sectional view of a portion of yet alternative configuration of the optical system 200 according to one or more embodiments. In FIG. 4C, much like the embodiment of FIG. 4B, a surface coupling implementation between the optical connector 400 and the optical engine 300 is provided. As illustrated, the optical lens array 328 is coupled with the PIC 312 so that the optical signal 202, when propagated, traverses from the optical fiber 404, through the lens 406, and to a focusing mirror 386 of the optical lens array 328 along a first optical axis. The focusing mirror 386 is configured to focus the optical signal 202 to the top surface 326 of the PIC 312 along a second optical axis that is different than the first optical axis. The first optical axis and the second optical axis can be offset ninety degrees (90°) from one another, e.g., as shown in FIG. 4C. The focusing mirror 386 can be arranged so that the surface of the focusing mirror 386 confronting or facing the angled surface 384 of the support wall 320 has a convex shape. Moreover, as shown in FIG. 4C, the backfill material 374 is positioned in a non-contiguous manner with material blocks being positioned on opposite sides of the focusing mirror 386.

In accordance with further inventive aspects of this disclosure, an optical connector can be configured as an Expanded Beam Optics (EBO) optical connector or a combination of a Mechanically Transferable (MT) and EBO optical connector, or an MT-EBO optical connector. Example embodiments of each implementation are provided below.

FIG. 5A is a schematic top view of an optical system 200A having an EBO optical connector 400A coupled with an optical engine 300A. The optical engine 300A includes, among other components, a lid 306A having a support wall 320A, a PIC 312A, and an optical lens array 328A coupled with the PIC 312A and the support wall 320A. The EBO optical connector 400A includes a ferrule 402A mated with one or more optical fibers 404A. The ferrule 402A can include one or more lenses. For the depicted embodiment of FIG. 5A, the ferrule 402A includes a plurality of lenses 406A. The lenses 406A are each aligned with a respective one of a plurality of lenses 334A of the optical lens array 328A. The lenses 406A of the ferrule 402A are each configured to focus an optical signal from their respective optical fibers 404A to collimate to their respective lenses 334A of the optical lens array 328A (one example collimating optical signal 202A is shown in FIG. 5A). The ferrule 402A, or EBO ferrule, can be formed as a molded monolithic structure, for example.

Moreover, the EBO optical connector 400A includes fine alignment features 408A, 410A. Specifically, in addition or alternatively to top and bottom chamfers (e.g., the first and second chamfers 412, 414 depicted in FIG. 2B), the ferrule 402A can include a first sidewall chamfer 430A and a second sidewall chamfer 432A. When used in combination with the top and bottom chamfers, the first sidewall chamfer 430A, the second sidewall chamfer 432A, the top chamfer, and the bottom chamfer can collectively define a chamfered edge along a perimeter of a ferrule cutout 420A, or rather, a chamfered perimeter defining the ferrule cutout 420A. Such an embodiment can facilitate fine alignment both vertically and horizontally, which may advantageously aid optical alignment of the lenses 406A of the ferrule 402A with the lenses 334A of the optical lens array 328A.

FIG. 5B is a schematic top view of an optical system 200B having an MT-EBO optical connector 400B coupled with an optical engine 300B. The optical engine 300B includes, among other components, a lid 306B having a support wall 320B, a PIC 312B, and an optical lens array 328B coupled with the PIC 312B and the support wall 320B. The MT-EBO optical connector 400B includes an MT ferrule 402B-1 and an "adapter" in the form of an EBO lens plate 402B-2. The EBO lens plate 402B-2 is coupled with the MT ferrule 402B-1 at one of its ends and mated with the optical lens array 328B at its other end. In this regard, a beam is able to expand or collimate from the EBO lens plate 402B-2 to the optical lens array 328B, which can facilitate low insertion loss and reflectivity as well as reduced sensitivity to dust, among other benefits. The combination of the MT ferrule 402B-1 with the EBO lens plate 402B-2 combines the benefits of an MT ferrule with the free space optics typically provided by an EBO ferrule.

The MT ferrule 402B-1 is mated with one or more optical fibers 404B. The optical fibers 404B can each be aligned with a respective lens of the EBO lens plate 402B-2. For the depicted embodiment of FIG. 5B, the EBO lens plate 402B-2 includes a plurality of lenses 406B. The lenses 406B are each aligned with a respective one of a plurality of lenses 334B of the optical lens array 328B. The lenses 406B are each configured to focus an optical signal from their respective optical fibers 404B to collimate to their respective lenses 334B of the optical lens array 328B. Further, as depicted in FIG. 5B, the EBO lens plate 402B-2 is arranged such that the lenses 406B thereof are recessed relative to a lead edge 416B of the EBO lens plate 402B-2.

The MT ferrule 402B-1 is coupled with the EBO lens plate 402B-2 by way of first and second pins 434B, 436B. Notably, leading ends 438B, 440B of the first and second pins 434B, 436B extend beyond a lens plane LP (e.g., along the first direction D1) in which lenses 406B of the EBO lens plate 402B-2 are positioned. Such an arrangement provides enhanced alignment of the MT ferrule 402B-1 with the EBO lens plate 402B-2. This unique arrangement is enabled by the lenses 406B being recessed relative to the lead edge 416B of the EBO lens plate 402B-2.

In addition, the EBO lens plate 402B-2 can include one or more fine alignment features, such as those described above with respect to the ferrule 402A of the EBO connector 400A of FIG. 5A.

In accordance with yet other inventive aspects of this disclosure, a method of assembling an optical engine will now be provided.

Figure 6B:
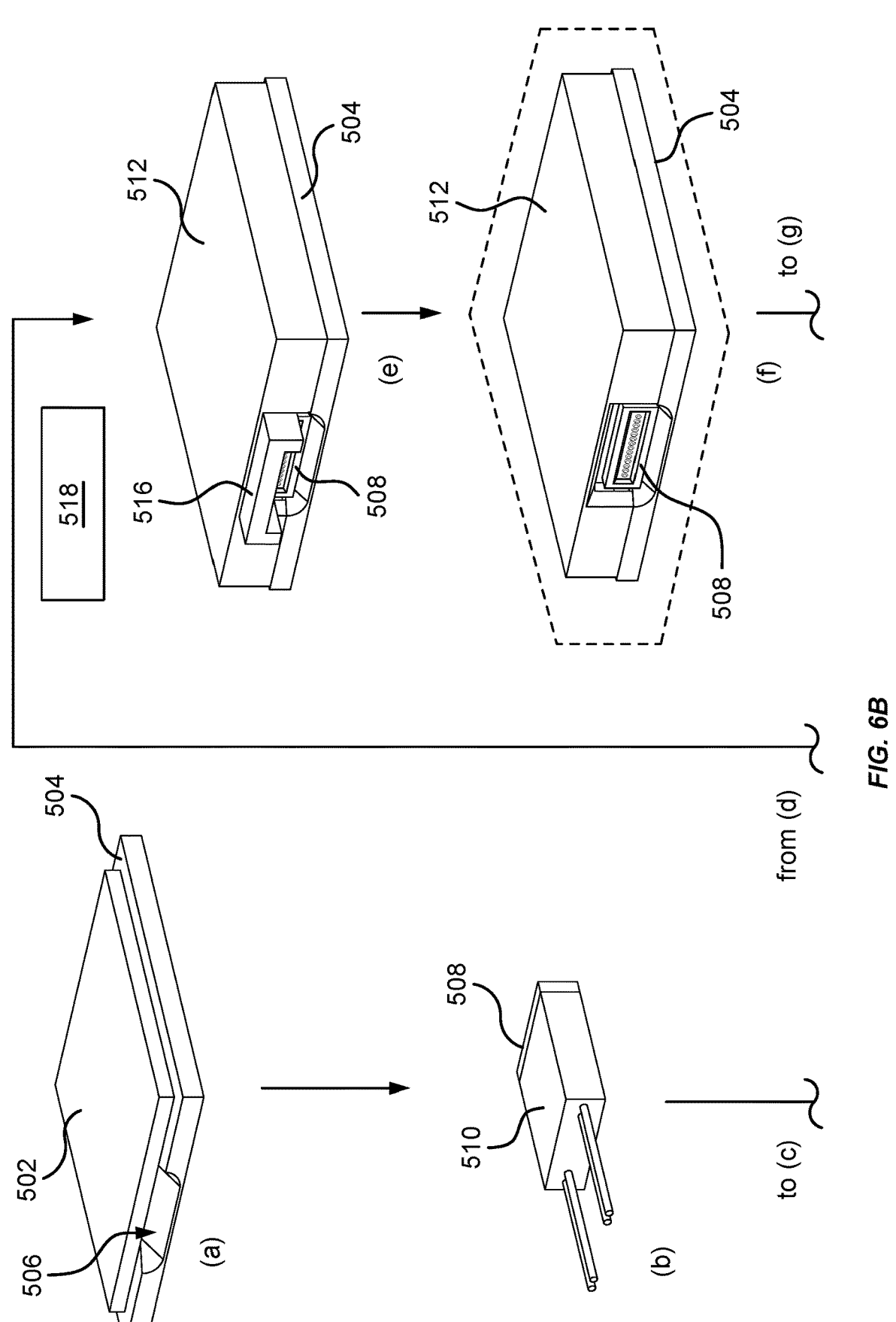
FIG. 6B depicts an optical engine being assembled in accordance with the method of FIG. 6A.
Figure 6B:
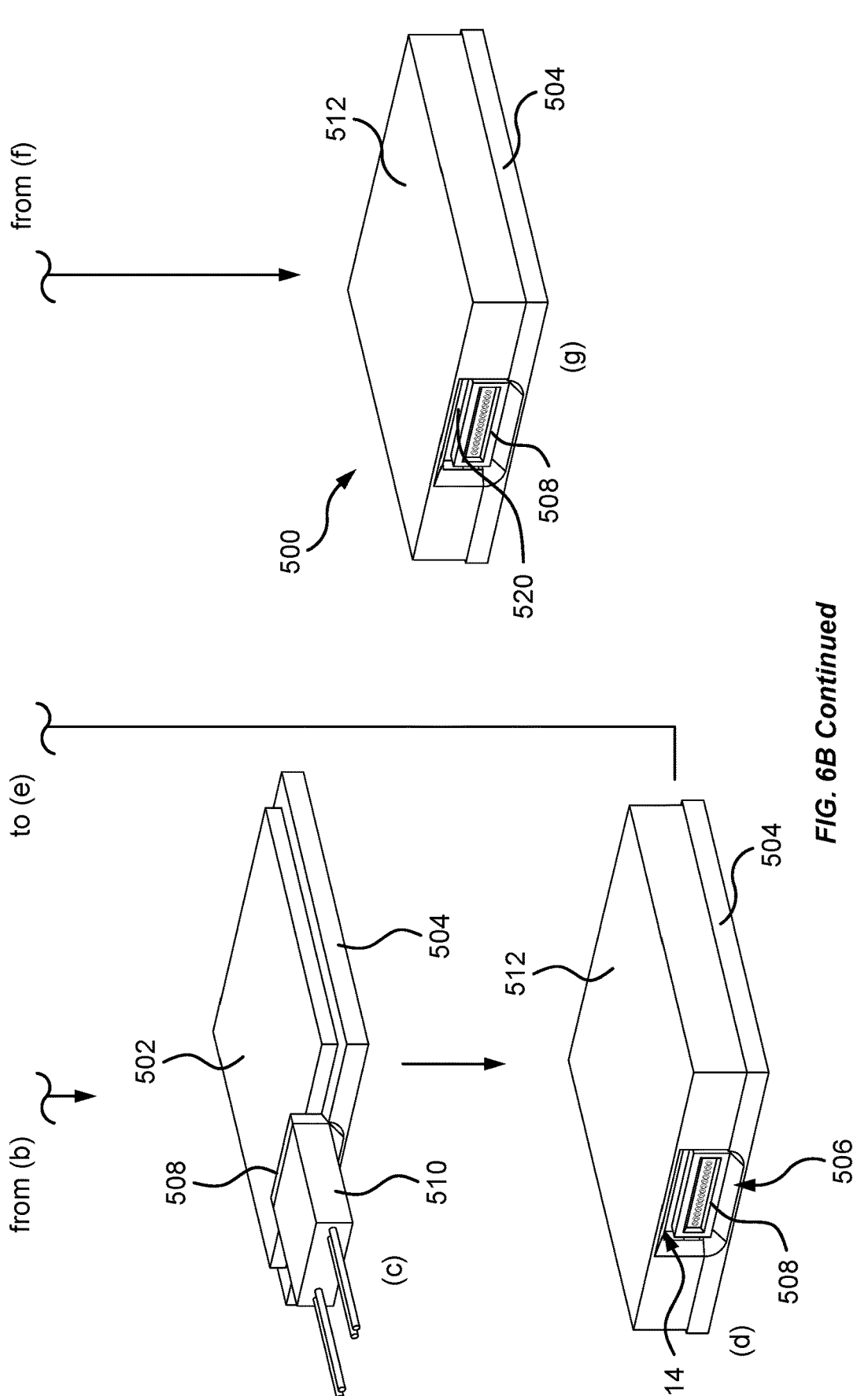

With reference now to FIGS. 6A and 6B, FIG. 6A is a flow diagram for a method 600 of assembling an optical engine according to one or more embodiments. FIG. 6B depicts an optical engine 500 being assembled in accordance with the method 600. However, the method 600 can be utilized to assemble other optical engines, such as any of those disclosed herein.

At 602, the method 600 can include coupling a PIC with a substrate. For instance, as shown in (a) of FIG. 6B, a PIC 502 is shown coupled with a substrate 504. The PIC 502 can be placed atop the substrate 504, e.g., in a Chip-On-Chip (COC) arrangement. Moreover, in FIG. 6B, the substrate 504 has a coarse alignment feature 506, which is arranged as a chamfered edge with radiused corners positioned on opposite sides of the chamfered edge. As will be explained below, an optical lens array is configured to be aligned with the coarse alignment feature 506 of the substrate 504 when the optical lens array is coupled with the PIC 502, and in some implementations, a coarse alignment feature of a lid of the optical engine 500.

At 604, the method 600 can include attaching an optical lens array to an optical alignment tool. For instance, as shown in (b) of FIG. 6B, an optical lens array 508 is shown attached to an optical alignment tool 510. The optical lens array 508 can include one or more lenses and one or more fine alignment features, such as one or more chamfered edges defining an optical lens array cutout in which the lenses of the optical lens array 508 are disposed. The optical alignment tool 510 can include a tool body and one or more optical fibers mated therewith. A light source, such as a laser, can be housed within the tool body. The optical fibers can be used to provide alignment feedback, e.g., when the optical lens array 508 is aligned with the PIC 502. The alignment feedback can be provided to a computing system associated with the optical alignment tool 510. The computing system can have one or more non-transitory memory devices and one or more processors, which can be embodied in one or more computing devices. The one or more non-transitory memory devices can store instructions that, when executed by the one or more processors, cause the one or more processors to perform operations, such as controlling a robot to adjust alignment of the optical lens array 508 relative to the PIC 502 based at least in part on alignment feedback provided by the optical alignment tool 510.

At 606, the method 600 can include aligning the optical lens array with the PIC in accordance with alignment feedback provided by the optical alignment tool. For instance, as shown in (c) of FIG. 6B, the optical lens array 508 is shown being aligned with the PIC 502 in accordance with alignment feedback provided by the optical alignment tool 510. Optical signals can be propagated through the optical fibers of the optical alignment tool 510 to determine whether such optical signals are propagating optimally through the optical lens array 508 to the waveguides of the PIC 502. In some implementations, a robot or robot arm can be adjusted to align the lenses of the optical lens array 508 relative to waveguides of the PIC 502 based at least in part on the alignment feedback provided by the optical alignment tool 510. In other implementations, voice commands or other instructions, such as visuals on an augmented reality application, can be provided to a user based at least in part on the alignment feedback provided by the optical alignment tool 510.

At 608, the method 600 can include coupling the optical lens array to the PIC when the alignment feedback indicates that optical signals traverse from the optical alignment tool, through the optical lens array, and to the PIC in accordance with one or more conditions. For instance, when the alignment feedback indicates that the optical signals pass through the optical lens array 508 and to the waveguides of the PIC 502 with one or more characteristics (e.g., an optical signal intensity, a delay from input to output, an attenuation of the optical signal, a physical alignment of the lenses of the optical lens array 508 relative to the waveguides of the PIC 502, a combination thereof, etc.) within a predetermined range, the one or more conditions can be deemed satisfied. Consequently, the optical lens array 508 can be considered aligned with respect to the waveguides of the PIC 502 and the optical lens array 508 can be coupled with the PIC 502 in the aligned position, e.g., by any suitable technique.

At 610, the method 600 can include detaching the optical alignment tool from the optical lens array. For instance, with reference to (d) of FIG. 6B, after coupling the optical lens array 508 to the PIC 502, the optical alignment tool 510 can be detached from the optical alignment tool 510.

At 612, the method 600 can include coupling a lid to the substrate, the lid having a coarse alignment feature that is configured to be aligned with the optical lens array when the optical lens array is coupled with the PIC. For instance, as illustrated in (d) of FIG. 6B, a lid 512 is shown coupled with the substrate 504. In this regard, the PIC 502 is enclosed within the interior defined by the lid 512 and the substrate 504. The lid 512, like the substrate 504, includes a coarse alignment feature 514. The coarse alignment feature 514 includes a top chamfer and sidewall chamfers as shown in FIG. 6B. The coarse alignment feature 514 is aligned with the optical lens array 508 (when the optical lens array 508 is coupled with the PIC 502), and is also aligned with the coarse alignment feature 506 of the substrate 504. The chamfered edges of the lid 512 and the chamfered edge and radiused corners of the substrate 504 can collectively define a perimeter guiding edge along a perimeter of an access opening to the optical lens array 508, e.g., as shown in FIG. 6B.

In some implementations, the method 600 can include arranging a spacer relative to the optical lens array coupled with the PIC, and wherein the spacer maintains proper spacing between the lid and the optical lens array when the lid is coupled to the substrate. For instance, as shown in (e) of FIG. 6B, a spacer 516 is shown placed over a top portion of the optical lens array 508, and when the lid 512 is coupled with the substrate 504, the spacer 516 can maintain proper spacing between the lid 512 and the optical lens array 508. The spacer 516 can also protect the optical lens array 508 during lid assembly. The spacer 516 can be a temporary spacer that can be removed, e.g., after assembly, or can be permanently positioned as shown in FIG. 6B.

In some implementations, in coupling the lid 512 to the substrate 504, the lid 512 is arranged relative to the substrate 504 and the optical lens array 508 via feedback from a machine vision system 518. The machine vision system 518 can include an image device, such as a camera or video camera, and a computing system communicatively coupled thereto. The machine vision system 518 can also include a robot arm that can be controlled to assemble the optical engine 500. The computing system can have one or more non-transitory memory devices and one or more processors, which can be embodied in one or more computing devices. The one or more non-transitory memory devices can store instructions that, when executed by the one or more processors, cause the one or more processors to perform operations, such as controlling the robot arm to assemble the lid 512 relative to the substrate 504 based at least in part on feedback received from the image device. In some implementations, the machine vision system 518 can also be used to assemble the optical lens array 508 relative to the PIC 502. In some other implementations, the machine vision system 518 can also be used in conjunction with the spacer 516.

At 614, the method 600 can include curing the lid relative to the substrate. For instance, as shown in (f) of FIG. 6B, the lid 512 is shown being cured relative to the substrate 504, which is represented by the dashed lines. The lid 512 can be cured relative to the substrate 504 in any suitable manner.

At 616, in coupling the lid to the substrate, a support wall of the lid can be positioned relative to the optical lens array so as to define a lens cavity therebetween, and in such implementations, the method 600 can further include backfilling the optical lens array cavity with a backfill material. For instance, as shown in (g) of FIG. 6B, the lid 512 includes the support wall 520 that generally confronts, but is spaced from, a rear wall of the optical lens array 508. The support wall 520 is positioned relative to the optical lens array 508 so as to define a lens cavity therebetween. In such implementations, a backfill material can be backfilled or otherwise placed in the lens cavity, e.g., to couple and provide mechanical support for the optical lens array 508. The backfill material can be an epoxy having properties such that a threshold hardness of the epoxy does not damage the optical lens array 508, e.g., as a result of thermally-induced stresses due to a mismatch of the CTEs between the optical lens array 328 and surrounding components, but yet rigid enough to provide mechanical support to the optical lens array 508, e.g., during peak force exposure, namely during optical connector insertion/extraction.

The fully assembly optical engine 500 is depicted in (g) of FIG. 6B.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied, at least in part, as a system, method, or computer program product. Accordingly, embodiments may take the form of an entirely hardware embodiment, an entirely software embodiment (including firmware, resident software, micro-code, etc.), or an embodiment combining software and hardware aspects that may all generally be referred to herein as a "circuit", "module", or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An optical system, comprising:
an optical engine having a photonic integrated circuit (PIC) and an optical lens array having a first lens that is optically aligned with a waveguide in the PIC; and
an optical connector optically aligned with the optical lens array to transfer optical signals between the optical connector and the waveguide in the PIC, the optical connector comprising a ferrule and an optical fiber mated with the ferrule, the ferrule comprising a second lens aligned with the first lens, wherein the optical lens array has a fine alignment feature and the ferrule includes a fine alignment feature, the fine alignment features of both the optical lens array and the ferrule are chamfers, and wherein the chamfers are shaped complementary to one another so as to facilitate optical alignment of the second lens of the ferrule with the first lens of the optical lens array.

2. The optical system of claim 1, wherein the optical lens array is coupled with the PIC.

3. The optical system of claim 1, wherein the optical lens array is coupled with the PIC so that an optical signal, when propagated, traverses from the optical fiber to an edge of the PIC.

4. The optical system of claim 1, wherein the optical lens array is coupled with the PIC so that an optical signal, when propagated, traverses from the optical fiber to a top surface of the PIC along at least two different optical axes.

5. The optical system of claim 1, wherein the optical lens array is coupled with the PIC so that an optical signal, when propagated, traverses from the optical fiber, through the second lens of the ferrule, through the first lens of the optical lens array, and to a focusing mirror of the optical lens array along a first optical axis, the focusing mirror is configured to focus the optical signal to a surface of the PIC along a second optical axis that is different than the first optical axis.

6. The optical system of claim 1, wherein at least one of the optical lens array and the ferrule has a fine alignment feature that facilitates optical alignment of the second lens with the first lens.

7. The optical system of claim 1, wherein the optical lens array defines an optical lens array cutout in which the first lens of the optical lens array is disposed, and wherein the optical lens array fine alignment feature is embodied as a chamfered edge along a perimeter of the optical lens array cutout.

8. The optical system of claim 1, wherein the optical engine has a lid and a substrate that each include a coarse alignment feature that facilitate alignment of the ferrule relative to the optical lens array.

9. The optical system of claim 8, wherein the coarse alignment feature of the lid and the coarse alignment feature of the substrate collectively define a perimeter guiding edge along a perimeter of an access opening that provides access to the optical lens array, the perimeter guiding edge being formed at least in part by chamfers.

10. The optical system of claim 1, wherein the optical engine has a lid and a substrate that collectively define an interior in which the PIC extends, the lid has a support wall extending relative to the optical lens array, the support wall and the optical lens array collectively define a lens cavity in which a backfill material is disposed.

11. The optical system of claim 1, wherein the ferrule is an expanded beam optics ferrule molded as a monolithic structure.

12. The optical system of claim 1, wherein the ferrule includes a mechanically transferable (MT) ferrule coupled with an expanded beam optics (EBO) lens plate, the EBO lens plate includes the second lens of the optical connector.

13. The optical system of claim 12, wherein the ferrule includes pins that couple the MT ferrule with the EBO lens plate, the pins have ends that extend beyond a lens plane defined by the second lens of the ferrule.

14. An optical engine, comprising:
a lid having a support wall and a lid chamfer;
a substrate having a substrate chamfer, the lid and the substrate defining an interior;
a photonic integrated circuit (PIC) positioned at least in part within the interior; and
an optical lens array coupled with the PIC and the support wall, the optical lens array having a first lens optically aligned with a waveguide of the PIC, and wherein the lid chamfer and the substrate chamfer are arranged to guide a ferrule of an optical connector toward the optical lens array and wherein the optical lens array has a chamfer arranged to guide a second lens of the ferrule into optical alignment with the first lens of the optical lens array.

15. An optical system, comprising:

an optical engine having a photonic integrated circuit (PIC) and an optical lens array having a first lens that is optically aligned with a waveguide in the PIC; and an optical connector optically aligned with the optical lens array to transfer optical signals between the optical connector and the waveguide in the PIC, the optical connector comprising a ferrule and an optical fiber mated with the ferrule, the ferrule comprising a second lens aligned with the first lens, wherein the optical engine has a lid and a substrate that each include a coarse alignment feature that facilitate alignment of the ferrule relative to the optical lens array.

16. The optical system of claim 15, wherein the optical lens array defines an optical lens array cutout in which the first lens of the optical lens array is disposed, and wherein the optical lens array has a fine alignment feature embodied as a chamfered edge along a perimeter of the optical lens array cutout.

17. The optical system of claim 15, wherein the optical lens array has a fine alignment feature and the ferrule includes a fine alignment feature, the fine alignment features of both the optical lens array and the ferrule are chamfers, and wherein the chamfers are shaped complementary to one another so as to facilitate optical alignment of the second lens of the ferrule with the first lens of the optical lens array.

* * * * *